United States Patent [19]

Kato et al.

[11] 3,873,500

[45] Mar. 25, 1975

[54] PHOTOSENSITIVE POLYMERS

[75] Inventors: Masao Kato, Yokohama; Masaki Hasegawa, Tokyo; Taro Ichijyo, Kamakura, all of Japan

[73] Assignee: Agency of Industrial Science & Technology, Tokyo, Japan

[22] Filed: June 8, 1972

[21] Appl. No.: 272,931

Related U.S. Application Data

[63] Continuation-in-part of Ser. No. 46,836, June 16, 1970, abandoned.

[52] U.S. Cl.............. 260/47 UA, 96/115 P, 117/124
[51] Int. Cl................................................ C08f 3/40
[58] Field of Search.......... 260/47 UA, 47 UR:63 R, 260/63 UY; 96/115 P

[56] References Cited
UNITED STATES PATENTS 2,934,526  4/1960  Hoffmann.......................... 260/88.1
3,364,282  1/1968  D'Alelio............................. 260/88.1

*Primary Examiner*—Christopher A. Henderson
*Attorney, Agent, or Firm*—Ernest G. Montague; Karl F. Ross; Herbert Dubno

[57] ABSTRACT

This invention relates to a composition comprising one or more members selected from the group consisting of vinyl ether derivatives of hydroxychalcone and homologs thereof and a cationic polymerization catalyst. It further concerns a photosensitive polymer obtained by polymerizing or copolymerizing the said composition. The polymerization of copolymerization product is a linear polymer or linear copolymer wherein only the vinyl group is polymerized and the photosensitive group is retained quantatively in the side chain. This polymer or copolymer has high photosensitivity and enables a photocrosslinking reaction to occur uniformly.

4 Claims, No Drawings

PHOTOSENSITIVE POLYMERS

REFERENCE TO RELATED APPLICATION

This is a continuation-in-part of our copending application Ser. No. 46,836 filed June 16, 1970 now abandoned.

FIELD OF THE INVENTION

This invention relates to a novel photosensitive polymer. More particularly, this invention relates to a photosensitive polymer in which only the vinyl group is polymerized and an unsaturated group of the generic formula:

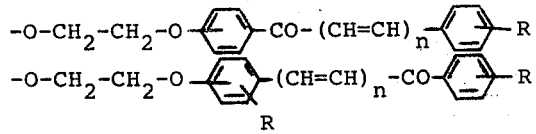

(wherein R is a member selected from the group consisting of hydrogen groups, lower alkyl and alkoxy groups and halogens, and $n$ is an integer having the value 1, 2 or 3) is contained in the side chain.

BACKGROUND OF THE INVENTION

The photosensitive resins of the photodimerization type which have heretofore been known include compositions which contain, as photosensitive components thereof, compounds of the type having cinnamic acid esterified with polyvinyl alcohols and compounds of the type having benzalacetophenone introduced into the aromatic ring of polystyrene. In the case of photosensitive resin compositions which are obtained by such polymer reaction, however, it is generally not possible to have the photosensitive groups introduced at a definite ratio into the backbone polymer chain. Thus these resin compositions provide nonuniform photoreactions, tend to induce such undesirable phenomena as fogging and defy all attempts to improve the sensitivity above a certain level.

SUMMARY OF THE INVENTION

The photosensitive polymer of this invention is very simple to manufacture. It has a structure in which the characteristic group capable of imparting photosensitivity is completely introduced into the basic polymer unit.

The polymer of this invention has, as its photosensitive component, a linear cationic polymer or linear cationic copolymer consisting of one or more compounds represented by the following generic formulas:

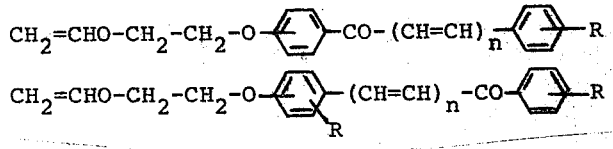

(wherein R and $n$ have the same meanings as in Formula (1) and (2)).

The polymer or copolymer mentioned above is produced by homopolymerizing or copolymerizing the compounds (3) and (4) in the presence of a cationic catalyst. That is to say, the polymer of the present invention is a polymer or copolymer in which addition polymerization is effected on the vinyl group moiety and an unsaturated group of Formula (1) or (2) is contained as the photosensitive group in the side chain.

The polymer or copolymer of this invention, therefore, has a structure in which the said photosensitive group is incorporated regularly and completely. As a result, it has higher photosensitivity than photosensitive polymers heretofore known to the art and permits photosensitizing reactions to occur uniformly.

What is more, the polymer of this invention has outstanding behaviors as a photoresist; it provides soft photographic tone, high adhesiveness and excellent photographic resolution. It is, therefore, used for the production of precision printing plates, integrated circuits, large scale integrated circuits, etc.

Linear copolymers formed of the compounds of Formula (1) and (2) with other chain polymerizable compounds are also included in the polymers of this invention. Proper selection of these chain polymerizable compounds, therefore, enables produced linear copolymers to acquire any desired degree of photosensitivity for different purposes.

It is the main object of this invention to provide a novel, industrially useful linear polymer or linear copolymer possessed of very high photosensitivity.

Other objects and characteristic features of the present invention will become apparent to those skilled in the art from the following, more detailed description of the invention.

Concrete examples of the compounds of Formulas (3) and (4) which are the raw materials for the polymers of this invention are 4'-(β-vinyloxy)-ethoxychalcone, 4-methoxy-4'-(β-vinyloxy)ethoxychalcone, 4'-(β-vinyloxy)ethoxyphenylbutadienalacetophenone, 4-(β-vinyloxy)ethoxychalcone, 4-(β-vinyloxy)-3-methoxychalcone, 4-(β-vinyloxy)ethoxy-4'methylchalcone, 4-(β-vinyloxy)ethoxy-4'-methoxychalcone and 4-(β-vinyloxy)ethoxyphenylbutadienalacetophenone.

These compounds are generally produced by either heating sodium, potassium, lithium and other alkali metal salts of 4-hydroxychalcone, 4'-hydroxychalcone and homologs thereof together with 2-haloethylvinyl ethers or heating the said salts in such alcohols as methanol and ethanol or in mixtures of these alcohols with such polar solvents as dioxane, tetrahydrofuran etc. In these reactions, yields are conspicuously improved by adding a small amount of quaternary ammonium salts to the reaction systems.

The compounds represented by the aforementioned Formulas (3) and (4) each have a vinyl group and an olefinic and a conjugated double bond. Manufacture of the polymers of the present invention has originated in the fact that the inventors took note of these different unsaturated groups. The polymers of this invention, therefore, has a structure in which the olefinic and conjugated double bond are retained intact in the side chain while only the vinyl group is polymerized.

The photosensitive polymers of this invention are manufactured by polymerizing or copolymerizing one or more compounds represented by Formulas (3) and (4) mentioned above with at least one monomer selected from the group consisting of chain polymerizable unsaturated compounds enumerated below.

The chain polymerizable unsaturated monomers which are used for the purpose just mentioned are such cationically polymerizable compounds as alkylvinyl ethers, alkylisoalkenylvinyl ethers, olefins, alkylstyrenes, halostyrenes, isoalkenylstyrenes, vinyl carbazole, vinyldioxolanes, dialkoxyethylenes, butadiene, and isoprene. These polymers and copolymers are novel substances which have never been reported in literature. They can be polymerized in the presence of a cationic polymerization catalyst.

As the cationic polymerization catalyst, there may be used one member or a cocatalyst made up of two or more members selected from the group consisting of boron trifluoride, etherification products thereof, stannic chloride, aluminum chloride, aluminum sulfate, titanium chloride, zinc chloride, and sulfuric acid. The amount of the catalyst to be used is in the range of 0.001 to 10 percent, preferably from 0.01 to 5 percent, by weight based on the monomer. No complete polymerization is obtained when the amount is below the lower limit of the said range. When the amount exceeds the upper limit of the range, however, the molecular weight of the resultant polymer fails to reach the desired level, though the velocity of polymerization may be increased.

The polymerization is usually carried out in a solvent. As the solvent, there may be used one member or a mixed solvent composed of two or more members selected from the group consisting of benzene, toluene, methylene chloride, ethylene chloride, nitromethane, carbon tetrachloride, and nitrobenzene which are invariably inactive to cationic polymerization.

Generally, the monomer concentration is in the range of from 0.5 to 90 percent by weight, though the practically desirable range is from 1 to 70 percent by weight.

Generally, the polymerization temperature is from −130° to 100°C.

The polymerization is generally carried out by following an ordinary procedure, with due precautions exercised not to allow water to enter the polymerization system. On completion of the polymerization, a small amount of ammonia, pyridine or some other weakly basic substance is introduced into the solution so as to inactivate the catalyst. The solution may be preserved without further modification or it may be concentrated and preserved in the concentrated form. Otherwise, this solution may be poured into an alcohol or some other suitable non-solvent containing therein a small proportion of the aforesaid weakly basic substance so as to liberate and refine the polymer contained therein.

Now, an explanation is made of the method adopted for confirming the fact that the novel compounds of this invention have a structure wherein only the vinyl group is polymerized and the structures of Formulas (1) and (2), namely the chalcone and its homologous structure, are contained in the side chain.

The explanation is first made with respect to 4-($\beta$-vinyloxy)-chalcone.

The NMR spectra of the dichloroform solution of 4-($\beta$-vinyl-oxy)ethoxychalcone show a signal due to the protons of vinyl group at 6.50 ppm and two signals due to the protons of olefinic double bond (trans) each at 6.92 ppm and 7.95 ppm. In the NMR spectra of the product obtained by the cationic polymerization of the said chalcone, the signal at 6.50 ppm has disappeared and the signals at 6.92 ppm and 7.95 ppm have remained. The ratio in relative area of the latter signals to those of phenyl group and methylene group (of the main chain) indicates that the olefinic double bond has not participated in the polymerization.

Completely similar results are obtained when the other members from the aforesaid group of compounds are subjected to cationic polymerization. Thus, it has been confirmed that their respective polymers invariably retain olefinic or a conjugated double bond quantitatively in the side chain.

Also in the case of the copolymerization of vinyl ether derivatives of homologs with the aforementioned cationically polymerizable monomers such as isobutyl-vinyl ether and $\alpha$-methyl-styrene which are generally known to exhibit vinyl polymerizing property, it has been confirmed by NMR spectrum analysis that soluble copolymers retaining the structure of chalcone or a homolog thereof quantitatively in the side chain are obtained in satisfactory yields similarly to polymers obtained in the case of homopolymerization.

As previously mentioned, the polymers and copolymers thus formed have the structure of chalcone and a homolog thereof represented by the generic formulas (1) and (2) as the side chains in the molecule. By virtue of the photosensitivity inherent to these peculiar structures, the polymers and copolymers are used for the production of photosensitive resins, varnishes and paints which enjoy excellent behaviors.

As will become evident from the Examples presented hereinafter, these polymers and copolymers are obtained in very high yields and are soluble.

When the polymers of the present invention are put to uses for which photosensitivity is one requirement, they may contain fillers, thermal polymerization inhibitors and the like which are popularly used as auxiliary ingredients. As the filler, there are used such inorganic substances as glass powder and silica and such synthetic resins as polypropylene, polymethacrylate, polyamide, and polyethylene terephthalate. The thermal polymerization inhibitors which are usable for the present invention include hydroquinone, pyrogallol, methylene blue, phenol, and n-butyl-phenol.

When the polymer composition of this invention is exposed to the sunlight or to the rays from a xenon lamp, mercury lamp, carbon arc or similar light source, the aforementioned homopolymer or copolymer which is the photosensitive ingredient undergoes a cross-linking reaction and consequently is insolubilized.

Because of this reaction, the composition can be used as a photosensitive resin for the production of photoresist, printing resin plate and photosetting bonding agent. It may also be used as the raw material for the production of film and other molded articles.

When the film formed of the photosensitive composition of this invention is exposed to rays through a negative film held fast against it and subsequently treated with a suitable solvent such as triclene, toluene, chloroform, carbon tetrachloride, or ethylene dicloride, the unexposed portion of the film is washed away and the exposed portion remains. Thus, the film produces a relief image.

The following Examples are further illustrative of this invention, and it will be understood that the invention is not limited thereto.

EXAMPLE 1

Manufacture of 4-(β-vinyloxy)ethoxychalcone 13.5cc of methanol solution containing sodium methoxide (wherein Na is contained in an amount of 0.0763g per 1cc of said sodium methoxide) was added to 30cc of methanol disolved in 10.0g of 4-hydroxychalcone, and methanol was thereafter removed under reduced pressure. The resultant is well ground to fine powder, and 50g of 2-chloroethyl vinyl ether and 0.5g of methyl triethyl ammonium iodide were added thereto. The mixture was refluxed under agitation for 2 hours. The resulting solution was sucked and filtered, and sodium chloride thus produced was separated. 2-chloroethyl vinyl ether remaining in the filtered solution was removed by distillation. The remainder, after dissolved with chloroform, was twice washed with water and dried by adding sodium sulfate anhydride. Further, the solvent was removed and the crystal of 4-(β-vinyloxy)ethoxychalcone was obtained in a yield of 11.30g. The crystal of 4-(β-vinyloxy)ethoxychalcone was recrystalled with n-hexane/benzene mixture and refined.

Melting point: 92°–94°C.
Calculated ($C_{19}H_{18}O_3$): C, 77.53%; H, 6.16%.
Found: C, 77.33%; H, 6.17%.

Manufacture of polymer

In a moistureproof flask fitted with a calcium chloride tube, a solution of 1.00g of 4-(β-vinyloxy)ethoxychalcone in 9.00g of methylene chloride was cooled to −25°C and combined, while under agitation, with 0.020g of boron trifluoride etherate. At the same temperature, agitation was continued for 3.5 hours. After polymerization, the contents were poured into a large volume of methanol containing a small volume of ammonia, to obtain a light yellow polymer.

The yield was 0.76g and the reduced viscosity (0.5 g/dl) was 0.15.

Treatment of photosensitive polymer

The polymer thus obtained was dissolved in a mixture of methyl ethyl ketone with chloroform. The solution was formed into a film on a glass plate and exposed to the high-pressure mercury lamp (50 W) as light source placed at a distance of 15cm. Consequently, the film was insolubilized.

EXAMPLE 2

Manufacture of 4-(β-vinyloxy)ethoxychalcone copolymer

A solution of 0.20g of 4-(β-vinyloxy)ethoxychalcone and 1.80g of isobutyl vinyl ether in 2.00g of methylene chloride was combined, while under room temperature (15°C), with 0.9mg of aluminum sulfate-sulfuric acid complex ($Al_2(SO_4)_3/3H_2SO_4/7H_2O$). Agitation was continued for 3.5 hours. After polymerization, the content was subjected to the same treatment as used in Example 1, to yield a light yellowish brown polymer.

The yield was 1.73g and the reduced viscosity was 0.55.

Treatment of photosensitive copolymer

The polymer thus obtained was formed into a film and exposed to the mercury lamp for 10 minutes according to the same method as used in Example 1. Consequently, the film was insolubilized.

EXAMPLE 3

Manufacture of 4'-(β-vinyloxy)ethoxychalcone 13.5cc of methanol solution containing sodium methoxide (wherein Na is contained in an amount of 0.0763g per 1cc of said sodium methoxide) was added to 30cc of methanol disolved in 10.0g of 4'-hydroxychalcone, and methanol was thereafter removed under reduced pressure. The resultant product is well ground to fine powder, and 50g of 2-chloroethyl vinyl ether and 0.5g of methyl triethyl ammonium iodide were added thereto. The mixture was refluxed under agitation for 2 hours. The resulting solution was sucked and filtered, and sodium chloride thus produced was separated. 2-chloroethyl vinyl ether remaining in the filtered solution was removed by distillation. The remainder, after dissolved with chloroform, was twice washed with water and dried by adding sodium sulfate anhydride. Further, the solvent was removed and crystals of 4'-(β-vinyloxy)ethoxychalcone was obtained as a yield of 12.08g. The crystals of 4'-(β-vinyloxy)ethoxychalcone were recrystalled with n-hexane-benzene mixture and refined.

Melting point: 87°–88°C.
Results of elementary analysis:
Calculated ($C_{19}H_{18}O_3$): C, 77.53%; H, 6.16%.
Found: C, 77.50%; H, 6.15%.

Manufacture of 4'-(β-vinyloxy)ethoxychalcone polymer

A solution of 1.00g of 4'-(β-vinyloxy)ethoxychalcone in 9.00g of methylene chloride was cooled to −37°C and combined with 0.02g of boron trifluoride etherate. At the same temperature, agitation was continued for 3 hours. After polymerization, the contents were subjected to the same after-treatment as used in Example 1 to yield a light yellow polymer.

The yield was 0.82g and the reduced viscosity was 0.23.

Treatment of photosensitive polymer

According to the same method as used in Example 1, the polymer thus obtained was formed into a film and exposed to light. Consequently, the film was insolubilized.

EXAMPLE 4

Manufacture of 4'-(β-vinyloxy)ethoxychalcone copolymer)

A solution of 1.50g of 4'-(β-vinyloxy)ethoxychalcone and 0.50g of isobutyl vinyl ether in 18.00g methylene chloride was cooled to −35°C and combined with 0.03g of boron trifluoride etherate. At the same temperature, agitation was continued for 2 hours. After polymerization, the content was treated in the same manner as in Example 1, to produce a substantially white polymer.

The yield was 1.83g and the reduced viscosity was 0.13.

Treatment of photosensitive polymer

The polymer thus obtained was formed into a film

EXAMPLE 5

Treatment of 4'-(β-vinyloxy)ethoxychalcone copolymer

A solution of 0.50g of 4'-(β-vinyloxy)ethoxychalcone and 4.50g of isobutyl vinyl ether in 5.00g of methylene chloride was combined with 2mg of aluminum sulfate-sulfuric acid complex and continuously agitated at 15°–16°C for 20 hours. After polymerization, the content was subjected to the same treatment as used in Example 1, to afford a light yellowish brown polymer.

The yield was 4.13g and the reduced viscosity was 0.60.

Treatment of photosensitive polymer

A film formed of the resultant polymer was exposed to light in the manner of Example 2. Consequently, the film was insolubilized.

EXAMPLE 6

Manufacture of 4-(β-vinyloxy)ethoxy-3-methoxychalcone polymer

A solution of 1.00g of 4-(β-vinyloxy)ethoxy-3-methoxychalcone in 9.00g of methylene chloride was cooled to −30°C and combined with 0.01g of boron trifluoride etherate. At the same temperature, agitation was continued for 3 hours. After polymerization, the reaction mixture was treated in the manner of Example 1, to afford a polymer.

The yield was 0.85g and the reduced viscosity was 0.09.

EXAMPLE 7

Manufacture of 4-(β-vinyloxy)ethoxy-4-methylchalcone polymer

A mixture of 1.50g of 4-(β-vinyloxy)ethoxy-4-methylchalcone in 14.00g of methylene chloride was cooled to −30°C and combined with 0.04g of stannic chloride. At the same temperature, agitation was continued for 3 hours. After polymerization, the reaction mixture was treated in the manner of Example 1, to produce a light yellow polymer.

The yield was 1.27g and the reduced viscosity was 0.17.

Treatment of photosensitive polymer

The polymer thus obtained was formed into a film and exposed to light in the same manner as in Example 1. Consequently, the film was insolubilized.

EXAMPLE 8

Manufacture of 4'-(β-vinyloxy)ethoxyphenylbutadienalacetophenone

A mixture of 1.00g of 4'-(β-vinyloxy)ethoxyphenylbutadienalacetophenone in 9.00g of methylene chloride was cooled to −25°C and combined with 0.03g of boron trifluoride etherate. At the same temperature, agitation was continued for 3 hours. After polymerization, the reaction system was treated in the same manner as in Example 1, to produce a polymer.

The yield was 0.75g and the reduced viscosity was 0.18.

Treatment of photosensitive polymer

The polymer thus obtained was formed into a film and exposed to light in the manner of Example 1. The film was consequently insolubilized.

What is claimed is:

1. A photosensitive polymer consisting of a polymerized vinyl chain of repetitive units selected from the group consisting of

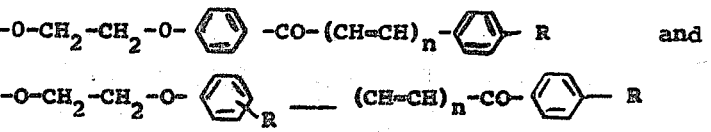

wherein R is hydrogen, halogen, lower alkyl or lower alkoxy, and $n$ is 1, 2 or 3.

2. The polymer of claim 1, which is a copolymer and has at least two different repetitive units which differ in at least one of R and $n$.

3. A photosensitive copolymer having a chain formed by copolymerizing the $CH_2=CH$ group of at least one monomer (1) of the formula

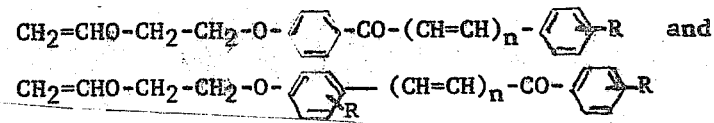

wherein R is hydrogen, halogen, lower alkyl or lower alkoxy, and $n$ is 1, 2 or 3, with a chain cationically copolymerizable unsaturated monomer (2), to form a copolymer chain containing pendant repetitive photosensitive units (3) selected from the formulae

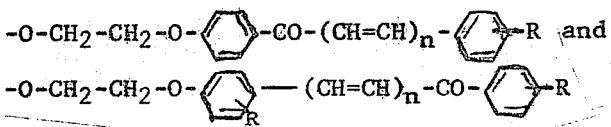

the amount of said repetitive photosensitive units (3) being sufficient to impart photosensitive characteristics to said copolymer.

4. The photosensitive copolymer of claim 3 wherein said at least one chain cationically copolymerizable unsaturated monomer (2) is selected from the group consisting of alkylvinyl ethers, alkylisoalkenylvinyl ethers, halostyrenes, isoalkenylvinyl ethers, olefins, isoalkenylstyrenes, vinyl carbazoles, vinyldioxolanes, butadienes and isoprenes.

* * * * *